United States Patent
Perälä

[11] Patent Number: 5,917,472
[45] Date of Patent: Jun. 29, 1999

[54] CURSOR CONTROL SYSTEM WITH MULTIPLE POINTING DEVICES

[75] Inventor: Paavo Perälä, Helsinki, Finland

[73] Assignee: International Computers Limited, London, United Kingdom

[21] Appl. No.: 08/856,883

[22] Filed: May 15, 1997

[30] Foreign Application Priority Data

May 29, 1996 [GB] United Kingdom .................. 9611172

[51] Int. Cl.⁶ .................................................. G09G 5/08
[52] U.S. Cl. ......................... 345/157; 345/158; 345/163
[58] Field of Search .................................. 345/157, 158, 345/168, 165, 164, 163, 326, 167, 145, 166, 2, 146; 707/506; 341/31

[56] References Cited

U.S. PATENT DOCUMENTS

| | | | |
|---|---|---|---|
| 5,168,269 | 12/1992 | Harlan ...................................... | 340/709 |
| 5,548,304 | 8/1996 | Yoshino et al. ........................... | 345/145 |
| 5,586,243 | 12/1996 | Barber et al. ............................. | 345/326 |
| 5,635,957 | 6/1997 | Feierbach et al. ........................ | 345/163 |

FOREIGN PATENT DOCUMENTS 2 225 136   5/1990   United Kingdom .

*Primary Examiner*—Richard A. Hjerpe
*Assistant Examiner*—Francis Nguyen
*Attorney, Agent, or Firm*—Lee, Mann, Smith, McWilliams, Sweeney & Ohlson

[57] ABSTRACT

A system including a personal computer (1) and a display (2) is usable by at least two persons (owner 3 and customer 5) in connection with an application which does not support multiple mice or multiple cursor presentations. Each person has a respective mouse (4,6) and the customer is permitted to participate in the operation of the application, at least to the extent of being able to point to objects on the screen by means of a cursor, rather than having to point with a finger etc or communicate verbally. This is achieved, without needing to modify the application, such as by loading appropriate mouse driver software into the personal computer in order to generate an auxiliary cursor for the customer, or using appropriate mice hardware/firmware/software, so that the customer's mouse can control the owner's cursor when required.

12 Claims, 3 Drawing Sheets

LEFT BUTTON
RIGHT BUTTON
MOVEMENTS

CURSOR CONTROL SYSTEM WITH MULTIPLE POINTING DEVICES

BACKGROUND OF THE INVENTION

This invention relates to personal computer (PC) systems and in particular to such systems where two or more people both see the same display and need to point out something on the display.

In some known PC games, two separate game controllers can be operated for the same screen. The standard game controller port supports two mice and a separate Y connector can be used. A standard PC input port does not support multiple game controllers. On the screen there can be different "cursors" or equivalent pointing devices for each player. Some multi-user games can be played on networks, in which case the application must support network use.

In teleconferencing applications, local and remote users can see at the local PC screen, multiple windows where remote and local PC screens are presented. One window can show one separate application and there can be only one active cursor at a time.

In classroom applications there can be multi-user screen sharing, and each PC including the teacher's PC require special controllers.

In a help desk application a customer contacts a help desk advisor via a data network and the same image can be viewed by the advisor at a support PC and the customer at a customer PC. The delay in transmitting graphic information between such computers is particularly troublesome when the computers are equipped with an input device requiring visual feedback, such as a mouse, as an operator's physical movement is not then keyed directly to the cursor movement. U.S. Pat. No. 5,168,269 attempts to overcome this problem by providing immediate visual feedback in the form of a second cursor, a Dynamic Temporary Dual Cursor, which is provided on the screen of the one PC along with the cursor transmitted from the other PC and which is moved in quick synchronisation with the input of the mouse input device. In time the transmitted cursor coincides with and merges with the Dynamic Temporary Dual Cursor.

Two people viewing one display, may be the PC "owner" (Host User) and a customer viewing the same VDU (Visual Display Unit) and, conventionally, there would be one mouse, operated by the Host User, for controlling the position of a cursor on the display. When it is necessary for the Guest User to, for example, select one item from of a multiple choice menu of a particular application, hitherto the Guest User has either pointed to the display with a finger or pen, for example, and/or communicated their choice verbally. If the pointing approach is employed, the screen of the display can become soiled with fingerprints or scratches. The verbal approach can be slower than the pointing approach and may involve misunderstandings between the Host User and the Guest User and thus incorrect selections.

It is an object of the present invention to overcome the aforementioned disadvantages in a system where two people are viewing the same VDU, as referred to in the previous paragraph.

SUMMARY OF THE INVENTION

According to the present invention there is provided a system including a personal computer and associated display means for use by at least two persons in connection with an application which does not support multiple mice or multiple cursor presentations, which persons can view the same screen during operation of the application either on a common single display means or on respective display means, wherein each person has a respective mouse and means are provided whereby each person can participate in the operation of the application, at least to the extent of pointing to an object on a said screen by appropriate control of a cursor by the respective mouse, without modifying the application, and whereby one said person controls the other said person's or persons' actions.

BRIEF DESCRIPTION OF THE DRAWINGS

Embodiments of the invention will now be described with reference to the accompanying drawings, in which.

SPECIFIC DESCRIPTION OF THE PREFERRED EMBODIMENTS

Figure 1:
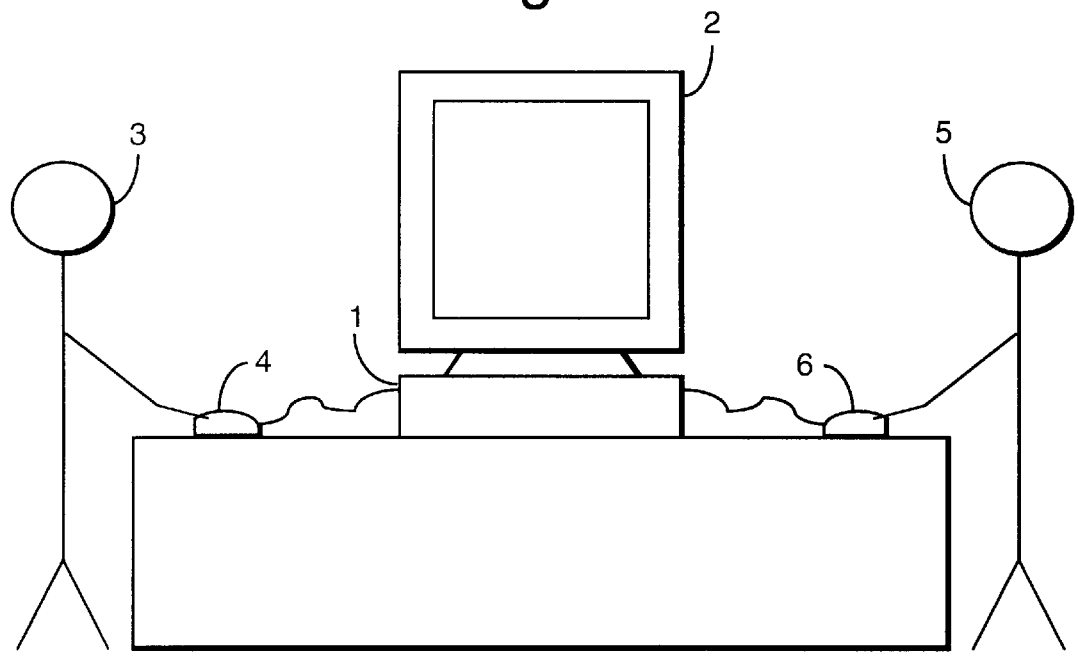
FIG. 1 illustrates, schematically, a Host User and a Guest User with respective mice.

Whereas in the known arrangements, referred to above, when the Host User and the Guest User are both looking at the same display it is only the Host User that has a mouse for pointing to an object by means of a cursor moveable by the mouse, and selecting that object by "clicking" on it with one of the mouse buttons, the present invention proposes that the Host User and the Guest User each have a respective mouse. This is illustrated schematically in FIG. 1 which illustrates a PC 1, a display 2, a Host User 3 with a respective mouse 4 and a Guest User 5 with a respective mouse 6.

Figure 2:
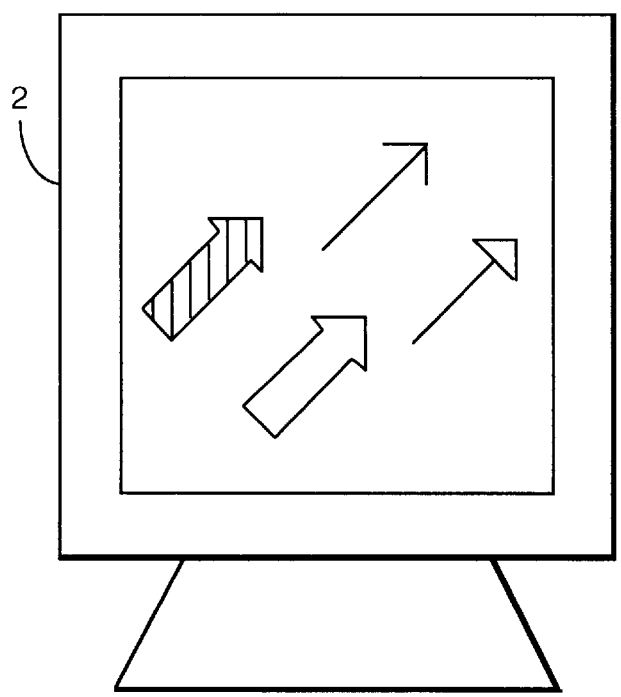
FIG. 2 illustrates, schematically, multiple cursors which differ from one another.

In one proposed embodiment the Guest User mouse controls the position of a respective cursor on the display, a so-called auxiliary cursor. Thus there are two cursors on the display and for ease of identity they should be different in some way, e.g. different colours or different shapes, as illustrated schematically in FIG. 2. Thus the Guest User can point to a particular item of a multiple choice menu of a particular application quickly and accurately and without the need for physically touching the display or saying anything, simply by controlling the position of the Guest User cursor by use of the Guest User mouse. Once the item is pointed to by the Guest User, the Host User can select the pointed-to items with his/her own mouse. Whilst the system could be such as to permit the Guest User to select an item with his/her mouse, for security or other reasons there are many situations where it would be unadvisable for the Guest User to have full control of the PC, and it is thus preferable for actual selection to be restricted to being made by the Host User.

Figure 3:
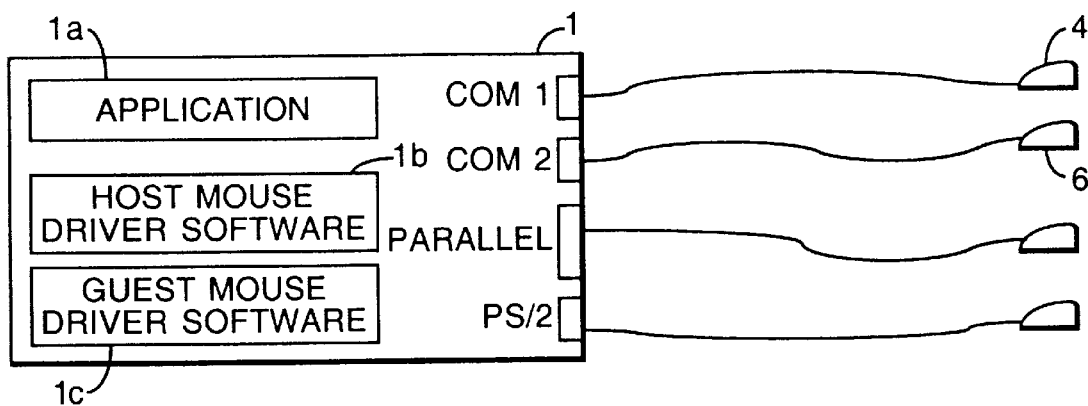
FIG. 3 illustrates, schematically, connection of multiple mice to standard PC ports.
Figure 4:
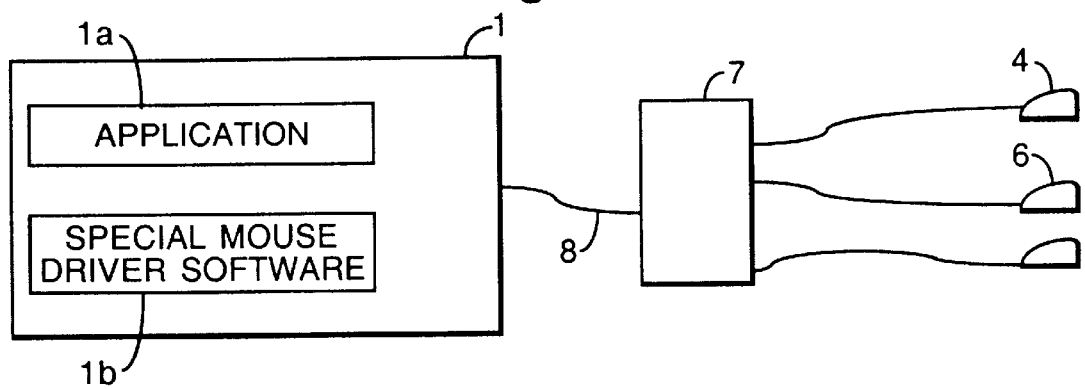
FIG. 4 illustrates, schematically, connection of multiple mice to a hub.

For such an embodiment a conventional mouse can be used for the Guest User mouse 6 and it would be connected to a free serial or parallel port of the PC, as illustrated schematically in FIG. 3, which has four ports: COM1, COM2, PARALLEL and PS/2, and into which is loaded an application 1a with Host User mouse driver software 1b, which application does not support multiple mice or multiple cursor presentations. Alternatively, the mouse can be connected to a hub 7 which is connected to the PC 1 via a Universal Serial Bus (USB) architecture 8, as indicated in FIG. 4. The Guest User separate cursor image requires the provision of corresponding Guest User mouse driver software 1c which preferably can be enabled/disabled by the Host User. The mouse driver software must also take into account the used operating system and display adaptor. This is believed to be well within the scope of the skilled artisan and no further description the mouse driver software is believed necessary. Whilst the Guest User mouse driver software must be provided, no modification is required to the used application itself. An example of conventional mouse driver software is that supplied by Logitech, Inc under the designation Logitech MouseWare 6.44.

In another proposed embodiment there are two mice, one mouse for the Host User and one mouse for the Guest User, but they control the same cursor ie the Host User cursor. The Guest User mouse is however, controlled by the Host User so that it can be overridden at any time. In particular, it can be configured by the Host User (enable/disable cursor movement, enable/disable left button, enable/disable right button etc). Thus the Guest User can be prevented from having full control of the PC for security or other reasons.

In a first implementation of this other type of embodiment conventional hardware can be used but special driver software is again required. In this implementation the Host User mouse is connected to the conventional port and the Guest User mouse is connected to a free serial or parallel port as in FIG. 3, or the FIG. 4, USB, architecture can be used. In this case the special mouse driver software 1d must, as well as being aware of the used operating system and display adaptor, have the following features, namely:

(a) achieve configuration of the Guest User mouse (enable/disable left button etc);

(b) combine the two mice so that the application software sees only one mouse driver, and (c) transfer the control between the two mice.

With regard to the transfer of control, there are a number of possibilities of when this can be achieved. For example, the Host User mouse may get control immediately it is moved, whereas the Guest User mouse may get control either after the Host User mouse has not been used for a specified time (time delay) or when the Host User has transferred control to the Guest User, for example by a hot key or selecting a specific icon or menu item on the display.

Figure 5:
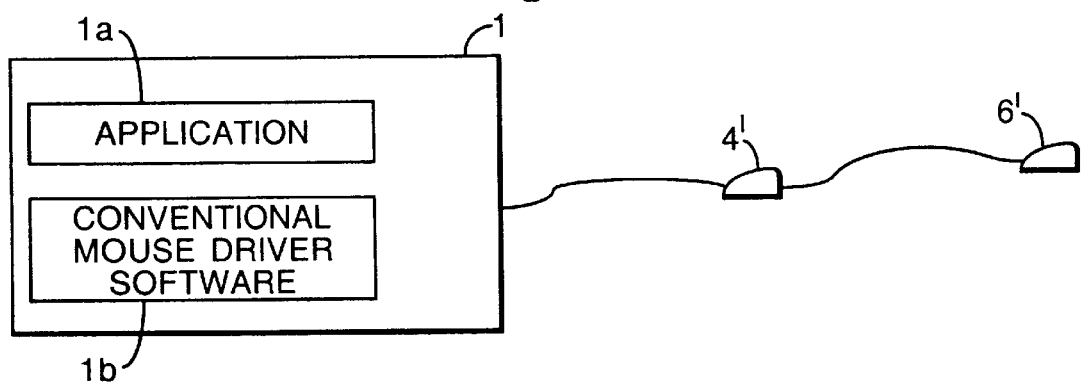
FIG. 5 illustrates, schematically, a Guest User mouse connected to a Host User mouse.
Figure 6:
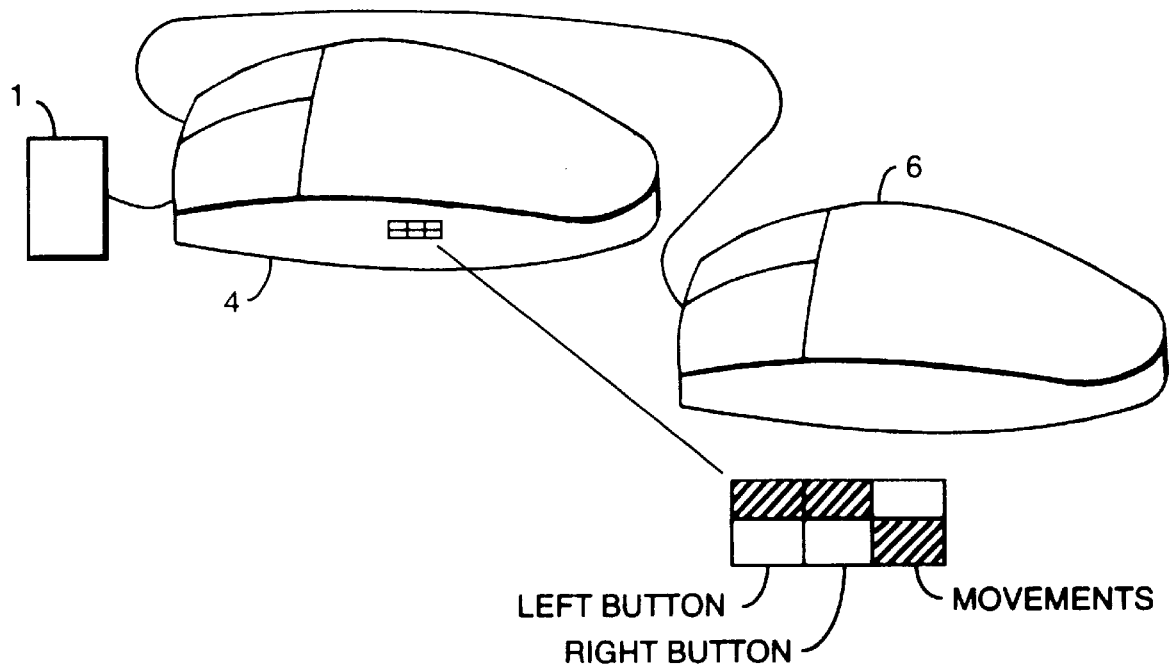
FIG. 6 illustrates, schematically, a variant of the system of FIG. 5.

In a second implementation of this other type of embodiment, conventional mouse driver software 1b can be used but special hardware is required. The Guest User mouse $6^1$ is connected to the Host User mouse $4^1$, which is connected to the PC 1, as indicated in FIG. 5. The Guest User mouse $6^1$ can be a standard mouse but if configuration is required, it will need dip switches, or the like, for enabling/disabling the left and right buttons. The Host User mouse is a standard mouse except that it requires a switch by means of which the Host User can control which mouse is connected to the PC system 1. Hence in this implementation a conventional mouse driver and a conventional Guest User mouse can be used, but the Host User mouse needs mechanical modification and furthermore the Host User mouse firmware has to be able to pass the PC commands to both mice and smoothly control which mouse is to send data to the PC system. In a variant of this implementation the Guest User mouse is standard and configuration (if required) is done with dip switches in the Host User mouse, as indicated in FIG. 6. Once again no new mouse driver is required and all of the changes required are in the Host User mouse. Even more firmware modification in the Host User mouse is required in this variant. In another variant, the Guest User mouse configuration can be done by software, meaning less mechanical changes in the Host User mouse, but in this case the mouse driver will need minor modifications.

Another implementation consists of standard mice being used for both the Guest User mouse and the Host User mouse, the former being connected to the latter. In this case the Host User mouse does not have extra switches, rather all the configuration and control of the mice is done by the firmware of the Host User mouse and the system mouse driver, which must thus be changed even more that the one in the previously described variant. There are, however, minimum mechanical changes.

Figure 7:
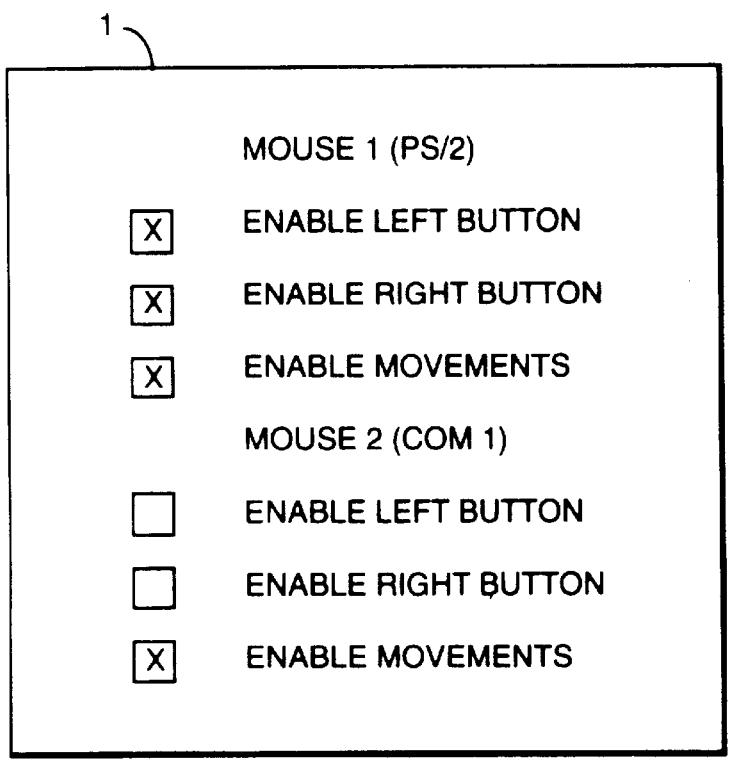
FIG. 7 illustrates a display option menu for a software driver whereby required options can be set.

As will be appreciated the type of embodiment with one cursor and two mice has the additional advantage that the Guest User also can make selections with the mouse buttons if the configuration allows that. Whilst the various implementations described have advantages of one form or another, the first described implementation with conventional hardware (mice) and special software is preferable on a cost basis at least. Standard mice are relatively cheap. In the case of a special software driver, the various enable (priority control) options for the two mice can be set using a display menu such as indicated in FIG. 7, for example.

Furthermore, it will be appreciated that the present invention does not require modifications to the applications with which it is used. The application can be a network application which does not support any multiple mouse and cursor presentations. The display can be transmitted to other places and inside the application the multiple mice and cursor ideas of the present invention can be employed. Also, combined remote control and local control of the same application is possible. There are a number of possible situations where multiple mice and cursors are needed, as will be apparent from the above and summarised below. For Host Guest discussions at the same display, there can be two or more persons discussing the operation and use of an application running at a single VDU that all can see, communication is easier if the participants can operate cursors or make menu choices with pointers that they operate via a personal mouse. In a simple case, there is just one cursor and the users operate it one at a time. Usually the Host User will want to keep control of the PC and thus his/her mouse can have priority of control. Shift of control between users can be achieved by means of extra switches, configured switches in the mice, or automatically in response to time delays or mouse movements.

In a more advanced system the participants other than the Host User, operate respective dummy cursors with their mice. These dummy cursors are visually different from one another and the Host User mouse cursor, and are generated on the screen by a special mouse driver rather than the application.

Dummy cursors can point to objects but cannot operate multiple choices as the cursor that can do that is controlled by the application.

For conference or classroom use, the display can for example be a wall projector system or a number of parallel VDUs. Each participant has a separate mouse which is connected to the computer by chaining them to the next mouse.

In situations where Guest Users contact Host Users (help desk advisors) by a data network, the Guest User can present an application situation with which help is needed at the help desk either as a full screen or a separate screen window. When the help desk wants to point at something at the Guest User PC, a special remote mouse channel is needed and activated i.e the Guest User uses a special mouse driver as discussed above. The driver is controlled, instead of a local auxiliary mouse, by the remote channel by the help desk. In this case, in both places the same "screen" is seen with an active cursor used by the Guest User and a dummy cursor operated by the Host User (help desk advisor).

I claim:

1. A computer including a personal computer and associated display means for use by two persons in connection with an application which does not support multiple mice, but which support a single mouse and an associated first cursor, which persons can view the same screen during operation of the application either on a common display means or a respective display means, wherein a first said person exclusively operates said single mouse and the associated first cursor, wherein a second said person exclusively operates a second mouse and an associated auxiliary cursor, each person being able to participate in the operation of the application, at least to the extent of pointing to an object on a said screen by appropriate control of the respective cursor by the respective mouse, without modifying the application, wherein the computer system includes mouse driver software for said single mouse and separate mouse driver software for said second mouse, and wherein the separate mouse driver software includes means allowing the setting of priority control options for the first and second mice by the first person so that the first person can enable/disable said separate mouse driver software and control whether or not the second mouse can be used to select an object on the screen as well as pointing to it.

2. A computer system as claimed in claim 1, wherein the auxiliary cursor is visually different from the first cursor.

3. A computer system as claimed in claim 1, wherein the single mouse is connected to one port of the personal computer and the other mouse is connected to another port of the personal computer.

4. A computer system including a personal computer and associated display means for use by at least two persons in connection with an application which does not support multiple mice or multiple cursor presentations, but which supports a single mouse and an associated single cursor, which persons can view the same screen during operation of the application either on a common single display means or a respective display means, wherein each person has a respective mouse and can participate in the operation of the application at least to the extent of pointing to an object on a said screen by appropriate control of the single cursor by the respective mouse, without modifying the application, and wherein the computer system includes mouse driver software for said single mouse loaded into the personal computer, the mouse driver software including means for control of the single cursor by each of the mice, means to configure buttons of the mice other than the single mouse whereby one said person can control the other said person's or persons' activities, means to combine the mice such that the application sees only one mouse driver and to control the transfer of control between the mice.

5. A computer as claimed in 4 wherein the one said person has priority of control of the single cursor.

6. A computer system as claimed in claim 4 wherein the one said person controls which mouse controls the cursor, and the one said person controls whether or not a said mouse can be used to make a selection of an object on a screen as well as pointing to it.

7. A computer system as claimed in claim 4, wherein the mouse driver software serves to control the transfer of control between said mice in response to operation delays, use of hot keys or special menu selection.

8. A computer system including a personal computer and associated display means for use by two persons in connection with an application which does not support multiple mice or multiple cursor presentations, but which supports a single mouse and an associated single cursor, which persons can view the same screen during operation of the application either on a common single display or a respective display means, wherein each person has a respective mouse and can participate in the operation of the application, at least to the extent of pointing to an object on said screen by appropriate control of the single cursor by the respective mouse, without modifying the application, and wherein the computer system includes mouse driver software for said single mouse loaded into the personal computer, wherein the single mouse is connected to a respective port of the personal computer and the mouse associated with the other person is connected to said single mouse, and wherein said single mouse has a switch for controlling which mouse is operatively connected to the personal computer, the said person operating the single mouse thereby being able to control the other person's activities.

9. A computer system as claimed in claim 8 wherein the mouse associated with the other person has switch means for enabling configuration thereof.

10. A computer system an claimed in claim 8 wherein the single mouse has switch means for enabling configuration of the mouse associated with the other person.

11. A computer system as claimed in claim 8 and including software for enabling configuration of the mouse associated with the other person.

12. A computer system including a personal computer and associated display means for use by two persons in connection with an application which does not support multiple mice or multiple cursor presentations, but which supports a single mouse and an associated single cursor, which persons can view the same screen during operation of the application either on a common single display means or a respective display means, wherein each person has a respective mouse and can participate in the operation of the application, at least to the extent of pointing to an object on said screen by appropriate control of the single cursor by the respective mouse, without modifying the application, and wherein the computer system includes mouse driver software for said single mouse loaded into the personal computer, wherein the single mouse is connected to a respective port of the personal computer and the mouse associated with the other person is connected to said single mouse, and wherein the mice are mechanically standard devices and mouse configuration and control of which mouse is connected to the personal computer is determined by appropriate firmware in the single mouse and mouse driver software for the mouse associated with the other persons loaded into the personal computer, the one said person operating the single mouse thereby being able to control the other person's activities.

* * * * *